(12) United States Patent
Kim et al.

(10) Patent No.: US 8,122,148 B2
(45) Date of Patent: Feb. 21, 2012

(54) METHOD AND APPARATUS FOR INTERNET CONNECTION OF MOBILE COMMUNICATION TERMINAL

(75) Inventors: Sang Heon Kim, Gumi-si (KR); Tae Seop Han, Gumi-si (KR); Tea Sul Kim, Jeollabuk-do (KR)

(73) Assignee: Samsung Electronics Co., Ltd., Maetan-Dong, Yeongtong-Gu, Suwon-Si, Gyeonggi-Do (KR)

( * ) Notice: Subject to any disclaimer, the term of this patent is extended or adjusted under 35 U.S.C. 154(b) by 1012 days.

(21) Appl. No.: 11/827,334

(22) Filed: Jul. 11, 2007

(65) Prior Publication Data
US 2008/0109733 A1 May 8, 2008

(30) Foreign Application Priority Data
Nov. 6, 2006 (KR) .................. 10-2006-0108655

(51) Int. Cl.
*G06F 15/173* (2006.01)
(52) U.S. Cl. ............ 709/238; 709/225; 707/104.1; 707/3; 715/234; 715/738
(58) Field of Classification Search .......... 709/238, 709/225; 707/104.1, 3; 715/738, 234
See application file for complete search history.

(56) References Cited

U.S. PATENT DOCUMENTS

| 7,536,639 | B2 * | 5/2009 | Griswold et al. | 715/234 |
| 2006/0253494 | A1 * | 11/2006 | Kang et al. | 707/104.1 |
| 2007/0050338 | A1 * | 3/2007 | Strohm et al. | 707/3 |

FOREIGN PATENT DOCUMENTS
KR 2001-103152 11/2001
* cited by examiner

*Primary Examiner* — Kyung H Shin
(74) *Attorney, Agent, or Firm* — Cha & Reiter, LLC

(57) ABSTRACT

A method and an apparatus for Internet connection of a mobile communication terminal are disclosed. The Internet connection method includes extracting URL (uniform resource locator) information from web sites of the Internet and storing the URL information and connecting to a web site of Internet by using the extracted URL information, wherein extracting URL comprises inputting at least one numeric value representative of the URL information and inputting an designated key for Internet connection after inputting the associated numeric values. According to the present invention, a user may connect to a desired web site by inputting a web site name by using numeric keys and an Internet key. Accordingly, the quantity of key strokes required for connecting to a web site is reduced and user convenience is improved.

18 Claims, 11 Drawing Sheets

FIG. 2

| DOMAIN ADDRESS | DOMAIN NAME | NUMERAL DATA |
|---|---|---|
| www.nater.com | nater | 62837 |
| www.koogle.com | koogle | 566453 |
| www.koogle.co.kr | koogle | 566453 |
| www.pizza.co.kr | pizza | 74492 |
| www.aced.com | aced | 2233 |
| www.cafe.com | cafe | 2233 |
| www.bade.com | bade | 2233 |
| ⋮ | ⋮ | ⋮ |

FIG. 6

| NO | DOMAIN ADDRESS | DOMAIN NAME | NUMERAL DATA | WEB PAGE NAME | URL |
|---|---|---|---|---|---|
| 1 | www.nater.com | nater | 62837 | nater | http:// www.nater.com |
| 2 | www.nater.co.kr | nater | 62837 | nater | http:// www.nater.co.kr |
| 3 | cafe.nater.co.kr | nater | 62837 | nater | http:// cafe.nater.co.kr |
| 4 | www.maves.co.kr | maves | 62837 | maves | http:// www.maves.co.kr |
| 5 | www.nater.com | nater | 62837 | NEWS | http:// www.nater.com/ news list.php? mode=LSD§ion_id =001&menu_id=001&view=1 |
| 6 | www.nater.com | nater | 62837 | AUTOMOBILE CAFE | http:// www.nater.com/ automobile.cafe |
| 7 | www.pizza.com | pizza | 74492 | pizza | http:// www.pizza.com |
| ... | ... | ... | ... | ... | ... |

The present invention has been made in view of the above problems, and the present invention provides a method and an apparatus enabling connection to a web site with the fewer key strokes in a mobile communication terminal.

METHOD AND APPARATUS FOR INTERNET CONNECTION OF MOBILE COMMUNICATION TERMINAL

CLAIM OF PRIORITY

This application claims the benefit of the earlier filing date, pursuant to 35 USC 119, to that patent application entitled "METHOD AND APPARATUS FOR INTERNET CONNECTION OF MOBILE COMMUNICATION TERMINAL" filed in the Korean Intellectual Property Office on Nov. 6, 2006 and assigned Serial No. 2006-0108655, the contents of which are incorporated herein by reference.

BACKGROUND OF THE INVENTION

1. Field of the Invention

The present invention relates to a mobile communication, and more particularly, to a method and an apparatus for Internet connection of a mobile communication terminal, enabling connection to a web site with the fewest key strokes.

2. Description of the Prior Art

With rapid development in technology of mobile communication terminals, the mobile communication terminals are providing a plurality of different functions, such as video phone, electronic scheduler, voice and image storage, Internet connection, entertainments, and content play, in addition to their basic functions of voice communication and message transmission. Among these functions, the Internet function searches for a web site by using an Internet browser installed in the mobile communication terminal.

Conventional mobile communication terminals generally utilize one of three Internet connection methods; selecting a home page as a startup page, inputting a URL address of a desired web site, and selecting a bookmark pre-stored by a user.

However, the conventional mobile communication terminals load the Internet browser first and then connect to the Internet by using one of the above Internet connection methods. A user may experience inconvenience in connecting to the Internet because different keys must be input consecutively to establish the Internet connection. Therefore, development of a simple and easy method for Internet connection is required for improving user convenience.

SUMMARY OF THE INVENTION

The present invention has been made in view of the above problems, and the present invention provides a method and an apparatus enabling connection to a web site with the fewer key strokes in a mobile communication terminal.

An Internet connection method for a mobile communication terminal according to an exemplary embodiment of the present invention includes extracting URL (uniform resource locator) information from web sites of the Internet and storing the URL information, and connecting to a web site of Internet by using the URL information.

A mobile communication terminal according to another exemplary embodiment of the present invention includes a storage unit for storing a web site domain address, a key input unit having alphanumeric keys and an Internet key for Internet connection, and a domain address processing unit for extracting a domain address corresponding to a numeral input through numeric keys of the key input unit or corresponding to web site information stored in the storage unit.

In the exemplary embodiments of the present invention, the web site includes all web sites accessible through the Internet. Additionally, a web page is not limited to an Internet home page, which is a main point of the entry of the web site, and may include various digital contents and data accessible through Internet.

BRIEF DESCRIPTION OF THE DRAWINGS

Features and advantages of the present invention will become more apparent from the following detailed description in conjunction with the accompanying drawings, in which:

FIG. 2 is a table showing a structure of a domain database of the mobile communication terminal of FIG. 1;

FIG. 6 is a table showing another structure of a domain database of the mobile communication terminal of FIG. 1;

DETAILED DESCRIPTION OF THE INVENTION

Hereinafter, exemplary embodiments of the present invention are described in detail with reference to the accompanying drawings. The same reference numbers are used throughout the drawings to refer to the same or like parts. Detailed descriptions of constructions or processes known in the art may be omitted to avoid obscuring the subject matter of the present invention.

Figure 1:
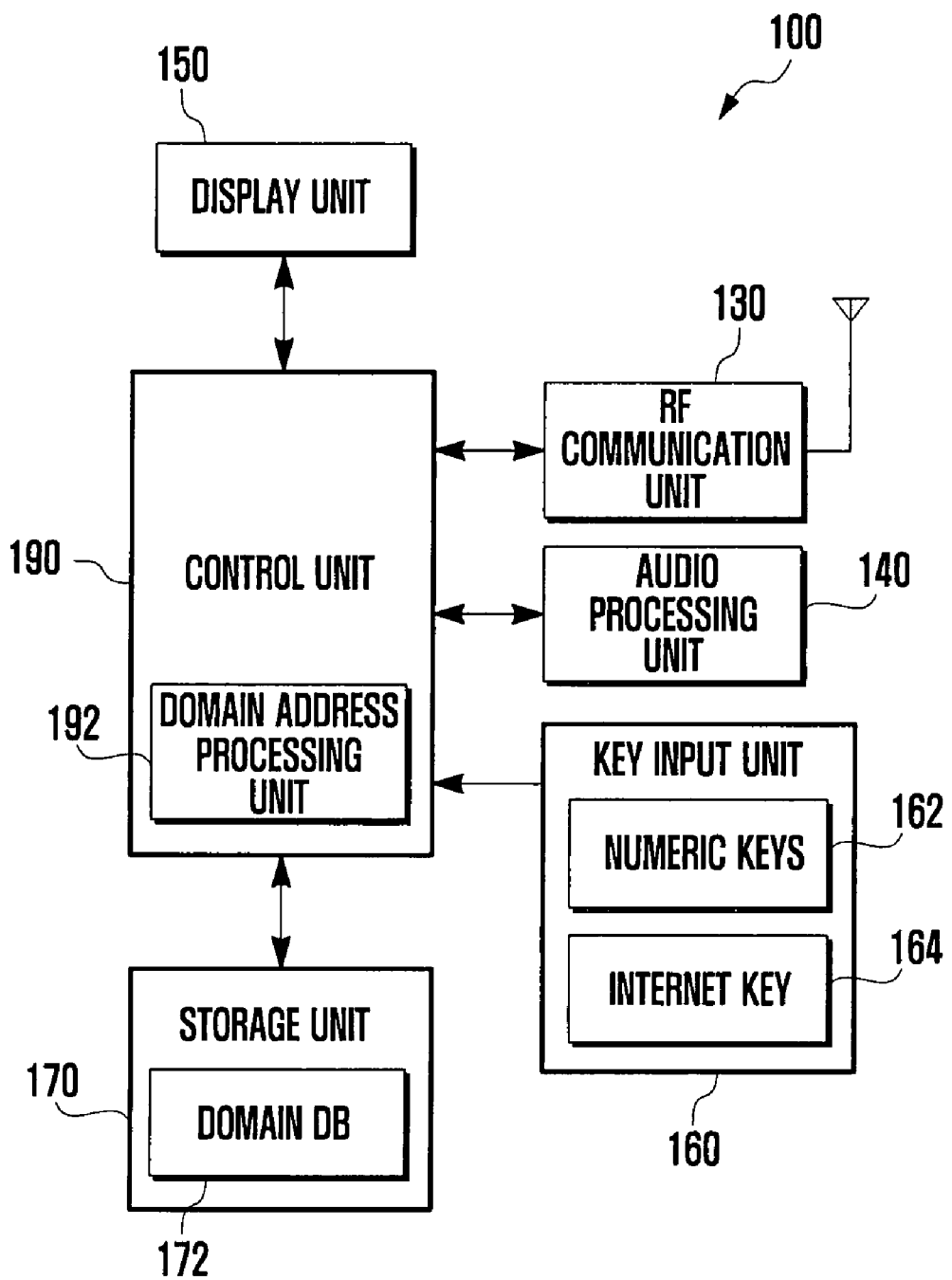
FIG. 1 is a block diagram showing a configuration of a mobile communication terminal according to an exemplary embodiment of the present invention.

FIG. 1 is a block diagram showing a configuration of a mobile communication terminal according to an exemplary embodiment of the present invention.

Referring to FIG. 1, the mobile communication terminal 100 includes an RF communication unit 130, audio processing unit 140, display unit 150, key input unit 160, storage unit 170, and control unit 190.

The RF communication unit 130 performs data communication of the mobile communication terminal 100 through a wireless network. The RF communication unit 130 includes an RF transmitter for up-converting the frequency of a signal to be transmitted and amplifying the signal, and an RF receiver for low noise amplifying and down-converting the frequency of a received signal. Additionally, the RF communication unit 130 outputs data received through a radio channel to the control unit 190 and transmits data output by the control unit 190 through the radio channel.

The audio processing unit 140 may be configured with a codec (coder/decoder) that may include a data codec for processing packet data and an audio codec for processing audio signals, such as a voice. During telephone conversation, the audio processing unit 140 converts a digital audio signal received from the RF communication unit 120 to an analog audio signal by using the audio codec and outputs the analog audio signal to a speaker. The audio processing unit 140 also converts an analog audio signal received from a microphone to a digital audio signal by using the audio codec and outputs the digital audio signal to the control unit 190.

The key input unit 160 receives a signal for operating the mobile communication terminal 100 from a user and outputs the signal to the control unit 190. For this, the key input unit 160 includes a control key (not shown) for operation of the mobile communication terminal 100 and a plurality of numeric keys 162 for inputting numerals. Additionally, the key input unit 160 includes an Internet key 164.

The Internet key 164 is used for Internet connection of the mobile communication terminal 100. When the Internet key 164 is input in a standby state of the mobile communication terminal 100, the control unit 190 invokes an Internet browser. Alternatively, Internet connection may be performed by at least one numeric key 162 and the Internet key 164, which will be described in more detail in the following Internet connection method. In this exemplary embodiment illustrated herein, an 'OK' key is used as the Internet key 164. However, the present invention is not limited thereto and the Internet connection may be performed by using any other control key or specially designated key or by using software, which may allow any key or combination of keys to act as an Internal control key.

The display unit 150 displays image data output by a camera module on a screen. An LCD (liquid crystal display) may be used as the display unit 150. The display unit 150 may include an LCD control unit, a memory unit for storing data, and LCD device. In such as a case the LCD may also have a touch screen function, wherein the screen of the display unit 150 may also be used as an input device.

The storage unit 170 includes a program memory and a data memory. The program memory stores programs for controlling general operation of the mobile communication terminal 100. The data memory stores data generated during the execution of the programs. The storage unit 170 further includes a domain database 172.

FIG. 2 is a table showing a structure of a domain database of the mobile communication terminal of FIG. 1. The domain database (hereinafter, DB) 172 is used for storing domain addresses and searching for a domain address by using a numeral input by the user. The domain DB includes a domain address field, domain name field, and numeral data field, as shown in FIG. 2.

The domain address field stores a domain address of a web site. The domain name field stores a domain name by excluding a bottom level portion, such as 'www', and a portion representing an organization or a country, such as 'com' and 'co.kr', from the domain address.

The numeral data field stores numeral data corresponding to a domain name stored in the domain name field. For example, in the case that the domain address of a web site is 'www.nater.com', a domain name 'nater' is stored in the domain name field and numberic data '62837' corresponding to 'nater' is stored in the numeral data field. Similarly, in the case that the domain address is 'www.pizza.com', a domain name 'pizza' and numeric data '74492' are stored in the domain name field and the numeral data field respectively. It would be recognized that the numerc data represents the letters of the domain address, wherein the numbers are associated with letter values on the key input device.

If more than one record having an identical domain name and different organization domains (for example, 'com', 'co.kr', 'org') exists in the domain DB 172, all records having the identical domain name have the same numeral data. For example, in the case of two records having the domain addresses 'www.koogle.com' and 'www.koogle.co.kr', both records have the same numeral data '566453'.

Additionally, the domain DB 172 may have the same numeral data even though the records have different domain addresses. In the example shown in FIG. 2, 'www.aced.com', 'www.cafe.com', and 'www.bade.com' are different domain addresses, however, the domain names 'aced', 'cafe', and 'bade' all correspond to the numeral data '2233', because characters a, b, and c are assigned to a numeric key '2', and characters d, e, f are assigned to a numeric key '3'.

The control unit 190 controls general operation of the mobile communication terminal 100 and the display a desired web site when connecting to Internet according to a user's request. Additionally, if the user inputs numeral data and inputs the Internet key 164, the control unit 190 promptly connects to Internet and controls the display of a web site corresponding to the input numeral data. For this, the control unit 190 includes a domain address processing unit 192.

The domain address processing unit 192 extracts a domain address by using a numericnumeric value provided or input by the user. That is, the domain address is extracted from the domain DB 172 of the storage unit 170 corresponding to the numericnumeric data input by the user. When the user connects to a new web site, the domain address processing unit 192 extracts a domain address of the corresponding web site and domain information (domain name and numeric data) and stores them in the domain DB 172.

Hereinafter, an Internet connection method for a mobile communication terminal 100 according to an exemplary embodiment of the present invention is described.

Figure 3:
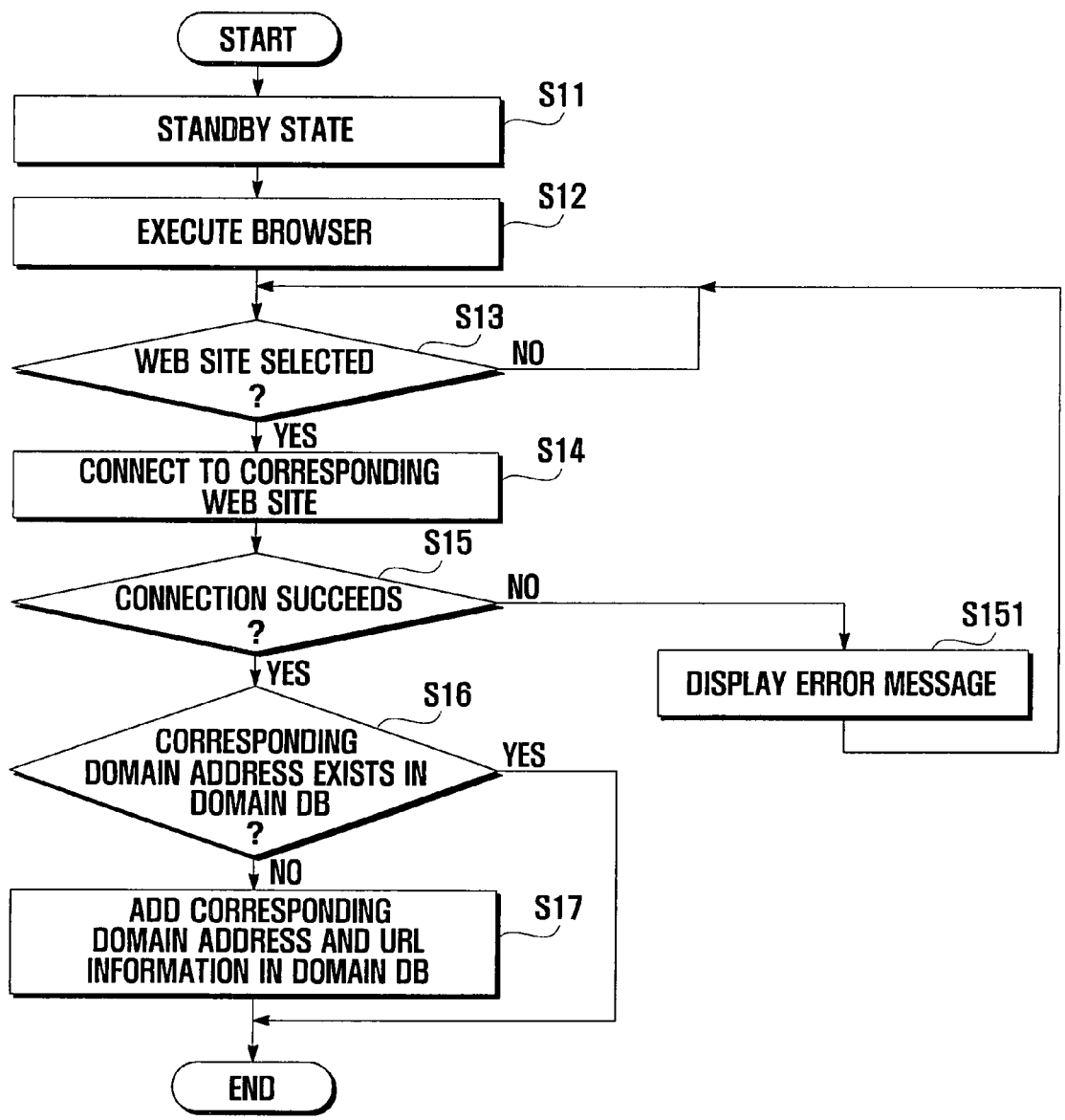
FIG. 3 is a flow chart showing a method of storing the domain database of FIG. 2 according to another exemplary embodiment of the present invention.

FIG. 3 is a flow chart showing a method of storing the domain database of FIG. 2 according to another exemplary embodiment of the present invention.

Referring to FIGS. 1 to 3, the mobile communication terminal 100 begins in a standby state (S11). If a user requests Internet connection by inputting a command via an Internet key 164 (e.g., 'OK' key), the control unit 190 invokes an Internet browser (hereinafter, referred to as 'browser') according to the user's request (S12).

While invoking the browser, the control unit 190 awaits a user command selecting a first web site to be displayed after the Internet connection (S13) is established. If the user selects a web site by inputting a domain address directly or by selecting a web site from a web site set as a home page and bookmarked web sites, the control unit 190 connects the mobile communication terminal to the corresponding web site (S14).

If connection to the web site is not successful due to errors such as absence of the selected web site (S15), the process proceeds to step S151 and the control unit 190 outputs an error message informing the user that the connection is not currently possible. Subsequently, the process returns to step S13 and the control unit 190 awaits further user selection of a web site.

If connection to the web site succeeds at step S15, the control unit 190 outputs content transmitted by the web site through the browser and extracts the domain address of the currently connected web site through the domain address processing unit 192.

The domain address processing unit 192 determines whether the extracted domain address exists in the domain DB 172 of the storage unit 170 (S16). Even though a web page has a different URL, the control unit 190 determines that the domain address exists in the domain DB 172 if the web page has an identical domain name.

If the extracted domain address does not exist in the domain DB 172, control unit 190 creates a new record by adding the domain address extracted at step S17 to the domain DB 172. At this moment, the domain name and numeric data extracted from the web site are stored in the database in addition to the domain address.

If the extracted domain address has already been stored in the domain DB 172, the control unit 190 terminates the process.

As described above, web site information is stored in the domain DB 172 whenever the user connects to a new web site.

Figure 4:
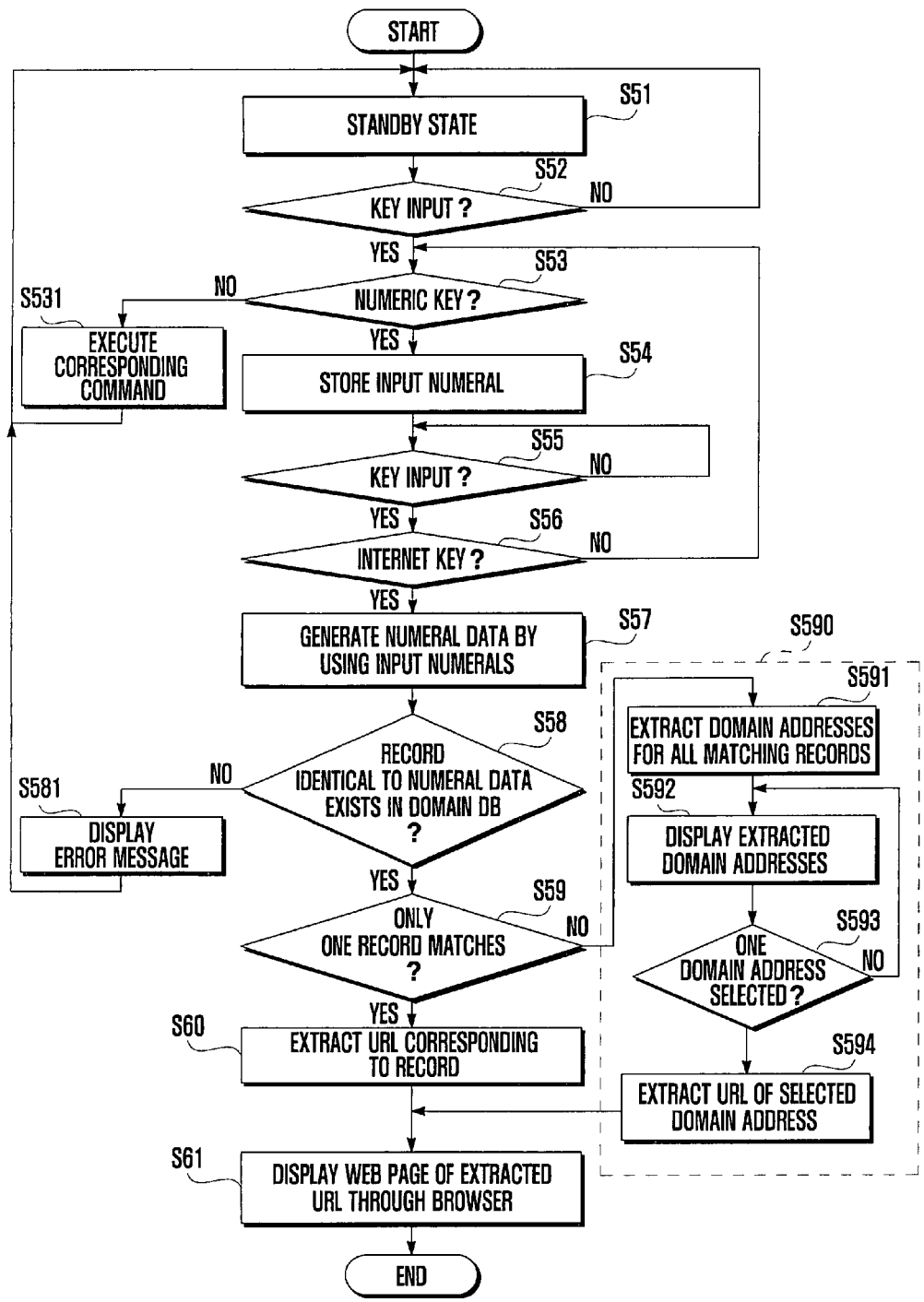
FIG. 4 is a flow chart showing a method of Internet connection by using the domain database of FIG. 2 according to another exemplary embodiment of the present invention.
Figure 5A:
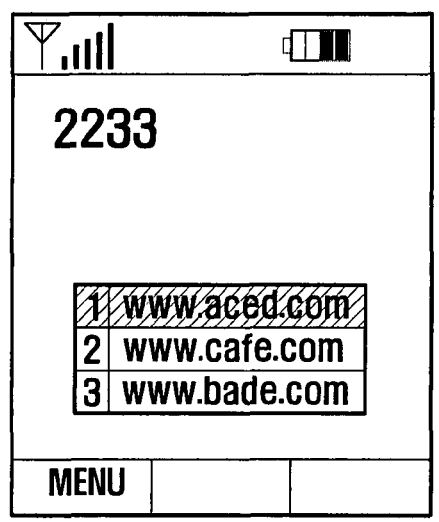
FIGS. 5A and 5B illustrate examples of domain selection screen displayed in the Internet connection method of FIG. 4.
Figure 5B:
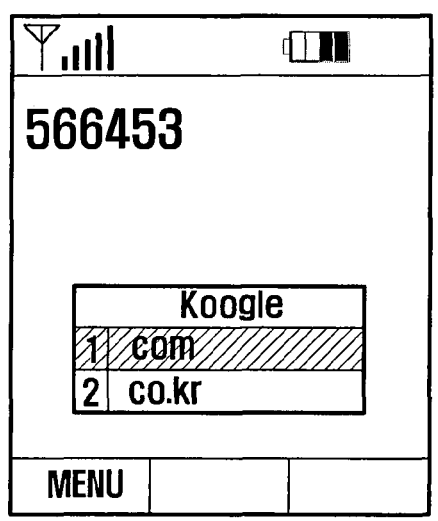

FIG. 4 is a flow chart showing a method of Internet connection using the domain database 172 of FIG. 2 according to another exemplary embodiment of the present invention. FIGS. 5A and 5B are examples of domain selection screens displayed in accordance with the Internet connection method of FIG. 4.

Referring to FIGS. 1 to 5B, in a standby state of the mobile communication terminal 100 (S51), a user inputs a key through the key input unit 160 (S52). The control unit 190 identifies whether the input key is a numeric key 162 (S53).

If the input key is a numeric key 162, the control unit 190 temporarily stores an associated numeric value (S54). Numeric data may be stored in a buffer memory of the control unit 190 or in the storage unit 170.

The user then depresses another key (S55) to input another numeric value and the control unit 190 identifies whether the input key is the designated Internet key 164 (S56). If the input key is not the Internet key 164, the process returns to step S53. If the key input at step S55 is determined to be a numeric key 162 at step S53, the control unit 190 temporarily stores the numeric value corresponding to the input numeric key 162 (S54). At step S53, if a key input at step S52 or S55 is determined to be other than the numeric key 162 (for example, a communication function key), the process proceeds to step S531 and the control unit 190 executes a function corresponding to the input key.

If the user inputs the numeric keys 162 consecutively, the control unit 190 repeats the above steps S52 to S56 and stores the input numerals accordingly.

When the Internet key 164 is pressed after storing the associate numeric values, the domain address processing unit 192 generates a numeric data value by using the temporarily stored numerals (S57).

The numeric data is generated by determining alphabetic letters corresponding to the character string of a domain name through the key input unit 160. For example, in the case that the user desires to connect to a web site 'www.cafe.com', the user inputs the word 'cafe' as the domain name of the web site by using the alphanumeric keys. Accordingly, numerals '2, 3, 3, 3' corresponding to the alphabetic letter 'c, a, f, e' are input by the key input unit 160.

In the case that numeric data '2, 2, 3, 3' are input consecutively, the domain address processing unit 192 generates numeral data '2233' by using the four numerals.

The domain address processing unit 192 then identifies whether a record having the numeric data value '2233' exists in the domain DB 172 (S58). That is, the domain address processing unit 192 searches numeral data fields of the domain DB 172 for a record having the numeral data '2233'.

If no record having the numeric data value '2233' exists in the domain DB 172, the control unit 190 displays a message that a web site corresponding to the input numeral does not exist (S581) and the process returns to step S51.

If a record having the numeric data value '2233' exists in the domain DB 172, the domain address processing unit 192 identifies whether only one record having the numeric data value '2233' exists (S59).

If only one record having the numeric data value '2233' exists in the domain DB 172, the domain address processing unit 192 determines an associated domain address from the numeric data value and outputs the domain address to the control unit 190 (S60). The control unit 190 then invokes the browser and connects to a web site corresponding to the output domain address (S61).

As described above, the mobile communication terminal may connect to a desired web site by inputting a numeric representation of a web site domain name and the Internet key 164 consecutively.

If more than one record having the numeric data value '2233' exists in the domain DB 172, the domain address processing unit 192 extracts all associated domain addresses having the numeric data value '2233' from the domain DB 172 (S591). Referring to FIG. 2, three records having the numeric data value '2233' exist in the domain DB 17. Accordingly, the control unit 190 extracts the associated domain address (www.aced.com, www.cafe.com, www.bade.com) stored in each record.

The domain address processing unit 192 then displays all the extracted domain addresses, as shown in FIG. 5A (S592). FIG. 5A shows domain addresses of records having the numeric data value '2233'. Although a method of displaying a domain address has been described in the exemplary embodiment of the present invention, the present invention is not limited thereto. For records having the same domain name, only one domain name may be displayed or one domain name and different portions of domain addresses may be displayed, as shown in FIG. 5B. For example, if the user inputs numeric data '566453', two records having the numeric value '566453' exist in FIG. 2. These two records have the same domain name 'koogle' but different organization domains (or country domains). Accordingly, the domain address processing unit 192 displays the domain name 'koogle' only as shown in FIG. 5B.

If a desired domain address (for example, www.aced.com) is selected from the displayed domain addresses (S593), the domain address processing unit 192 extracts an associate URL address (for example, http://www.aced.com) of the selected domain address (S594).

Subsequently, the control unit 190 invokes the browser (S61) with the determined URL address and connects to a web site corresponding to the domain address (www.aced.com) selected by the user.

Figure 7:
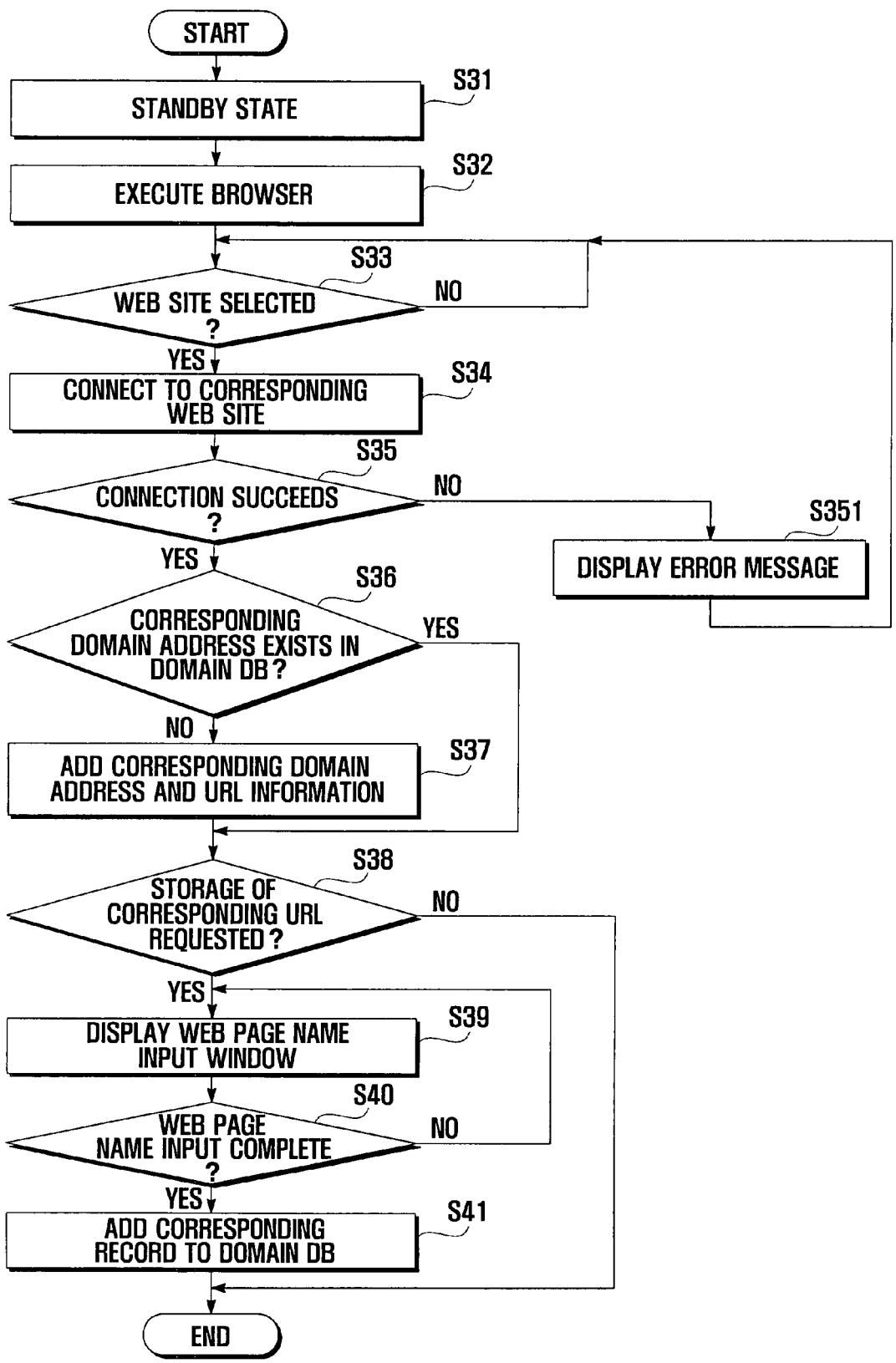
FIG. 7 is a flow chart showing a method of storing the domain database of FIG. 6 according to another exemplary embodiment of the present invention.
Figure 8:
FIG. 8 is an example of a web site input window displayed in the method of storing the domain database of FIG. 7.

FIG. 6 is a table showing another structure of a domain database of the mobile communication terminal of FIG. 1. FIG. 7 is a flow chart showing a method of storing the domain database of FIG. 6 according to another exemplary embodiment of the present invention. FIG. 8 is an example of a web site input window displayed in the method of storing the domain database of FIG. 7.

The method of storing a domain database according to this exemplary embodiment is similar to that according to the previously described exemplary embodiment shown in FIG. 3 and has differences only in the steps of storing a record (steps S38 to S41 of FIG. 7). That is, steps S31 to S37 of this exemplary embodiment are identical to steps S11 to S17 of the previously described exemplary embodiment shown in FIG. 3, however subsequent steps are performed differently. Therefore, detailed description of the same steps is omitted here.

Referring to FIG. 6, as described in the previous exemplary embodiment, the domain database 172 includes a domain address field, domain name field, and numeric data field, and further includes a web page name field and a URL field.

The web page name field stores a web page name input by a user. When storing information of a web page, a step of inputting a web page name is performed to specify the characteristic of the web page. At this step, the input web page name is stored in the web page name field. The web page name field is described in more detail in the following Internet connection method. The URL field stores a complete URL address of the corresponding web page.

Hereinafter, the Internet connection method is described referring to FIGS. 6 to 8. The Internet connection method according to this exemplary embodiment is performed by using the mobile communication terminal 100 of FIG. 1.

If a domain address of a web site to be connected does not exist in the domain DB 172 (S36), the domain address processing unit 192 adds the corresponding domain address to the domain DB 172 (S37). Here, the same data are stored in the web page name field of the domain DB 172 as in the domain name field.

Subsequently, the control unit 190 identifies whether storage of URL data is requested by the user (S38). A web site may include a number of web pages internally and each web page has a different URL address. Therefore, in the case that the user desires to connect to a lower-level web page instead of the highest-level page of the web site (home page), the user may request storage of URL data by pressing a storage key (not shown) in a state of connection to the corresponding web page.

If storage of URL data is requested, the control unit 190 outputs a web page input screen, as shown in FIG. 8 (S39). If a desired web page name (for example, 'news') is input by the user through the web page name input screen (S40), the control unit 190 creates a new record by using the input web page name (S41). That is, the control unit 190 creates a new record by adding data to the domain address field, domain name field, and numeric data field by using the domain address, adding the web page name input at step S40 to the web page name field, and adding an entire URL address to the URL field of the domain DB 172.

Figure 9:
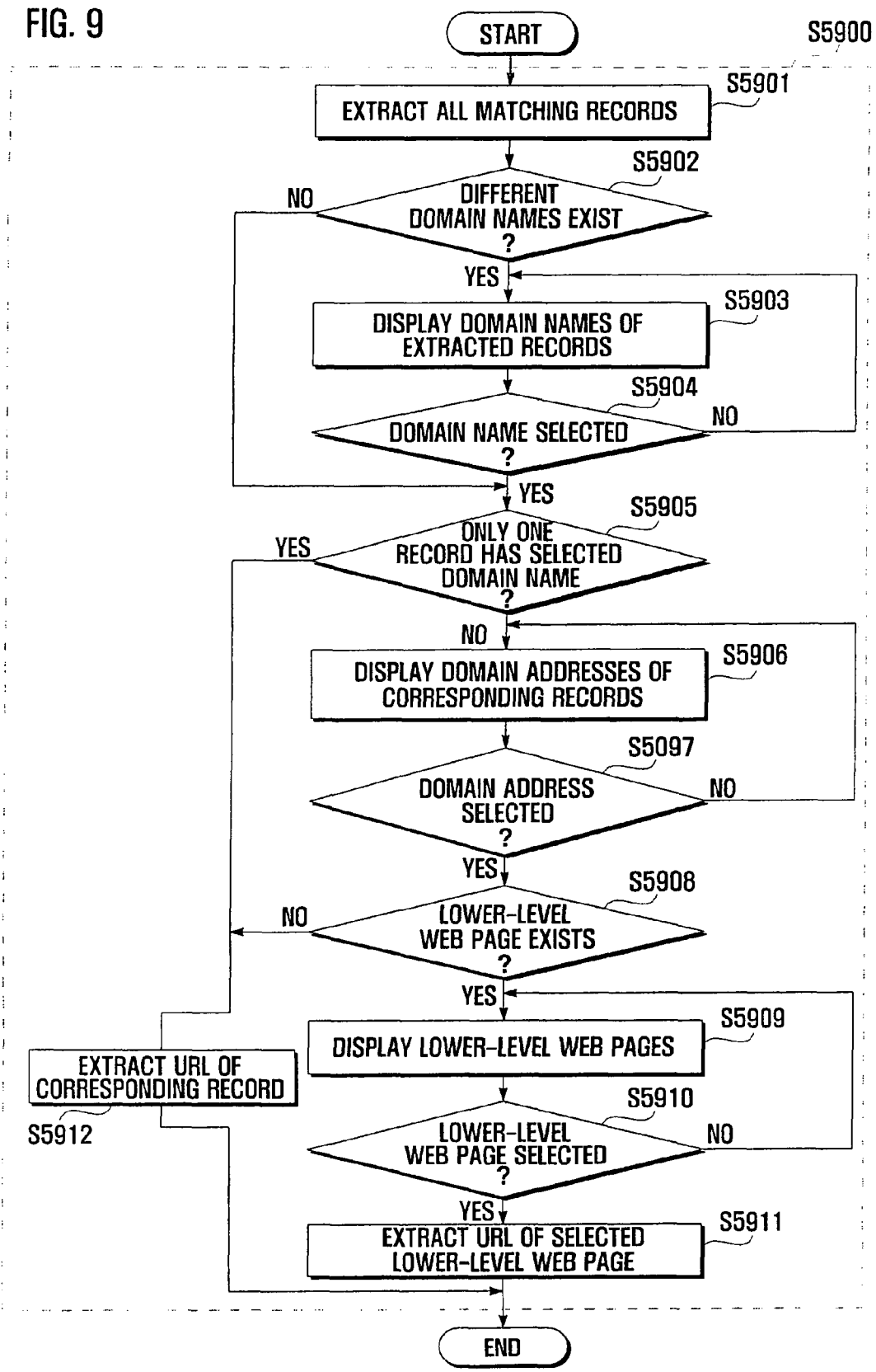
FIG. 9 is a flow chart showing a partial process of a method of Internet connection using the domain database of FIG. 6 according to another exemplary embodiment of the present invention.
Figure 10A:
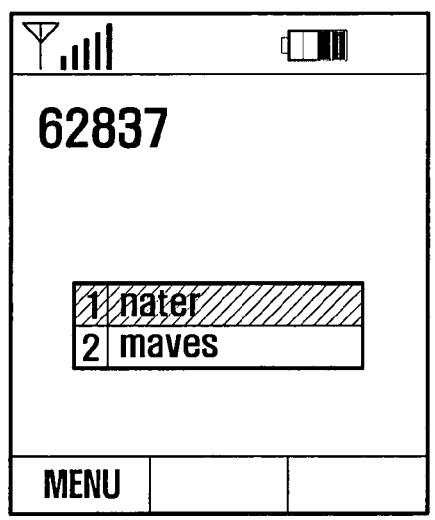
FIGS. 10A to 10C are examples of domain selection screen displayed in the Internet connection process of FIG. 9.
Figure 10B:
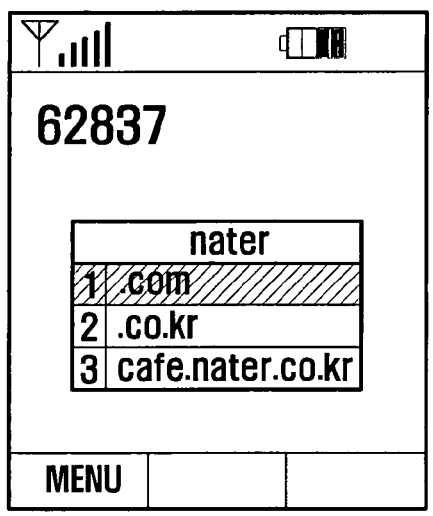
Figure 10C:
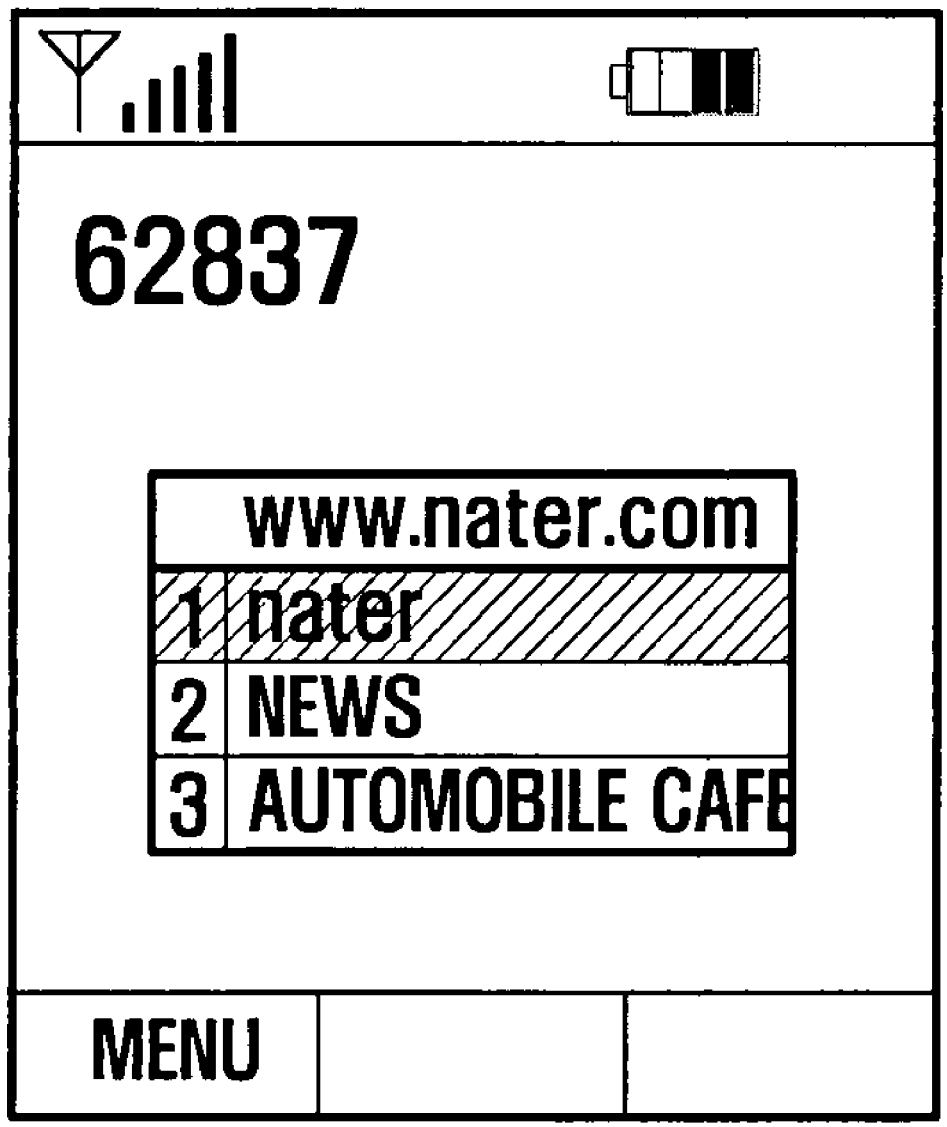

Hereinafter, the Internet connection method is described referring to the domain DB 172. FIG. 9 is a flow chart showing a partial process of another method of Internet connection using the domain database of FIG. 6 according to another exemplary embodiment of the present invention. FIGS. 10A to 10C are examples of domain selection screens displayed in the Internet connection process of FIG. 9.

The Internet connection method according to this exemplary embodiment is similar to that previously described in the exemplary embodiment shown in FIG. 4, but has differences in processing a plurality of records having identical numeric data to that input by the user. In this exemplary embodiment, steps S51 to S 61 of FIG. 4 are performed in the same manner as in the previously described exemplary embodiment. However the process S590 of the exemplary embodiment shown FIG. 4 is replaced in the present exemplary embodiment with the process S5900 shown in FIG. 9. Therefore, detailed description of the same steps is omitted here. In this exemplary embodiment, an example of inputting '62837' as numeric data, for example, is described for convenience in explanation.

Referring to FIGS. 1, 4, and 6 to 10C, in a partial process S5900 of the Internet connection method of the present exemplary embodiment, if more than one record having the numeric data value '62837' input by the user at step S59 of FIG. 4 exists in the domain DB 172, the domain address processing unit 192 extracts all records having the numeric value '62837'(S5901).

The domain address processing unit 192 identifies whether any of the domain names of the extracted records, namely, data stored in the domain name fields, are different from each other (S5902). If all the domain names are identical, the process proceeds to step S5905. If different domain names exist, the domain address processing unit 192 outputs each different domain name, as shown in FIG. 10A (S5903). Although a plurality of records having the same domain name 'nater' (for example, record number 1, 2, 3, 5, 6 of FIG. 6) exist, the domain address processing unit 192 outputs only one domain name, as shown in FIG. 10A.

If domain names are displayed at step S5903, the user may select a desired domain name (S5904). Hereinafter, an example is described assuming that the user selects 'nater' as the domain name.

If the user selects the domain name 'nater', the domain address processing unit 192 identifies whether only one record having the selected domain name 'nater' exists (S5905).

If only one record having the domain name 'nater' exists, the process continues at step S5912, and the domain address processing unit 192 extracts URL data of the corresponding record and transmits the extracted URL data to the control unit 190. Subsequently, the process continues at step S61 of FIG. 4 and the control unit 190 displays a web page corresponding to the URL address.

If a plurality of records having the domain name 'nater' exist, the domain address processing unit 192 outputs each domain address of the records through the display unit 150 (S5906). The domain address processing unit 192 outputs only different portions of the domain addresses as shown in FIG 10B. In FIG. 6, domain addresses having the domain name 'nater' are 'www.nater.com', 'www.nater.co.kr', and 'cafe.nater.com'. In the case that the records have the identical domain name and different organization domains (or country domain), the domain address processing unit 192 outputs only portions of the domain addresses such as '.com' and '.co.kr'. In the case that the bottom level portion of the domain address is different, as with 'cafe.nater.com', the user may experience difficulty in identifying the domain address. Accordingly, the exemplary embodiment preferably uses a method of displaying a complete domain address. However, the present invention is not limited thereto and may use other display methods enabling easy identification of a domain address.

The user may select one of the domain addresses (S5907). Hereinafter, an example is described assuming that the user selects an organization domain '.com'.

If the user selects the organization domain '.com', that is, if the user selects the domain address 'www.nater.com', the domain address processing unit 192 identifies whether a lower-level web page record of the corresponding domain address 'www.nater.com' exists (S5908). A lower-level web page record is a record created by directly inputting a web page name in the method of storing a domain database of FIG. 7.

If no lower-level web page record exists, a URL address of the corresponding record is extracted at step S5912, then the process continues at step S61 of FIG. 4 and the control unit 190 displays a web page corresponding to the URL address.

If a lower-level web page record exists, the domain address processing unit 192 extracts a web page name stored in the lower-level web page record and displays the web page on the display unit 150 as shown in FIG. 10C (S5909). Accordingly, the user may select a desired web page from the highest-level web page of the domain address and lower-level web pages such as 'news' and 'automobile cafe'.

If the user selects a web page (S5910), the domain address processing unit 192 extracts a URL address of the selected web page name and outputs the URL address to the control unit 190 (S5911).

Subsequently, the process continues at step S61 of FIG. 4 and the control unit 190 connects to a web page corresponding to the URL through the browser and displays the web page.

According to the exemplary embodiment of the present invention, the user may easily connect to the highest-level page (basic page) of a web site or to a lower-level web page of the web site.

As described above, the method and apparatus for Internet connection of a mobile communication terminal according to the present invention enables easy connection to a desired web page by inputting a domain name of a web site by using numeric keys and an Internet key. Accordingly, the quantity of key strokes required for web site connection is reduced and user convenience is improved.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

Although exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined in the appended claims.

For example, an exemplary embodiment of the present invention discloses an example of connecting to the Internet by inputting a portion of a domain name. However, the present invention is not limited thereto and various Internet connection methods, for example, connecting to Internet by inputting a full domain address, may be utilized.

Additionally, another exemplary embodiment of the present invention utilizes a method of extracting, from a domain DB, only records having numeric data identical to a numeric value input by a user. However, any record including a numeral input by the user may be extracted even though the numeral data of the record does not exactly match the numeral input by the user.

Although the exemplary embodiments of the present invention disclose Internet connection methods for a mobile communication terminal, the Internet connection methods may be applied to all electronic devices having numeric keys and an Internet key.

What is claimed is:

1. An Internet connection method for a mobile communication terminal comprising the steps of:
    extracting URL (uniform resource locator) information from web sites of Internet and storing, in a domain database on the mobile communication terminal, the URL information, the URL information including at least a corresponding web site domain address; and
    connecting to a web site by using the extracted URL information, wherein connecting to one of said URL addresses comprises the steps of:
    inputting at least one numeric data value;
    extracting a record, from the domain database, corresponding to the at least one input numeric value, said record including URL information, wherein individual elements of a domain name portion of the URL information are determined as alphanumeric values corresponding to the at least one inputted numeric values;
    extracting all records corresponding to the input numeric values;
    selecting a record from the extracted records; and
    inputting an Internet key for Internet connection to the selected record.

2. The Internet connection method of claim 1, wherein extracting and storing the URL information comprises:
    connecting to a web site of Internet; and
    extracting URL information from the connected web site; and
    creating a record in the domain database using the extracted URL information.

3. The Internet connection method of claim 2, wherein the record is created if a record identical to the URL information does not exist in the domain database.

4. The Internet connection method of claim 2, wherein the domain database comprises:
    a domain address field for storing a domain address of the web site;
    a domain name field for storing the domain name included in the domain address; and
    a numeral data field for storing numeral data corresponding to the domain name stored in the name field, wherein the numeral data is determined based on a conversion of the domain name to corresponding numeric values.

5. The Internet connection method of claim 2, wherein connecting to a web site of Internet comprises:
    extracting the domain address from the extracted record; and
    connecting to a web site corresponding to the extracted domain address.

6. The Internet connection method of claim 5, further comprising the step of:
    identifying, prior to extracting a record, whether a record corresponding to the input numerals exists in the domain database.

7. The Internet connection method of claim 6, further comprising the step of:
    displaying an error message if a record corresponding to the input numerals does not exist in the domain database.

8. The Internet connection method of claim 1, wherein the step of selecting a record comprises the step of:
    extracting domain addresses individually from the extracted records;
    displaying all the extracted domain addresses; and
    selecting a domain address from the displayed domain addresses.

9. The Internet connection method of claim 8, wherein, if the extracted domain addresses are partially different from each other, only different portions of the domain addresses are displayed.

10. The Internet connection method of claim 4, wherein the domain database further comprises:
   a URL address field for storing a URL address of a web site; and
   a web page name field for storing a web page name specifying a characteristic of the web site.

11. The Internet connection method of claim 1, wherein connecting to a web site of Internet further comprises the step of:
   extracting a URL address from the extracted record; and
   connecting to a web site corresponding to the extracted URL address.

12. The Internet connection method of claim 11, further comprising the step of:
   identifying, prior to extracting a record, whether a record corresponding to the input numerals exist in the domain database.

13. The Internet connection method of claim 12, further comprising the step of:
   displaying an error message if a record corresponding to the input numerals does not exist in the domain database.

14. The Internet connection method of claim 11, wherein the step of extracting a record further comprises the steps of:
   extracting all records corresponding to the input numeric value; and
   connecting to web site corresponding to the selected record.

15. The Internet connection method of claim 14, wherein selecting a record comprises the step of:
   extracting a domain name from each of the extracted records and displaying all the individual domain names;
   selecting a domain name from the displayed domain names;
   extracting the domain addresses from records containing the selected domain name and displaying the domain addresses;
   selecting a domain address from the displayed domain addresses;
   extracting a web site name from each record containing the selected domain address and displaying the individual web site names;
   selecting a web site name from the displayed web site names; and
   extracting a record containing the selected web site name.

16. The Internet connection method of claim 15, wherein, if the extracted domain addresses are partially different from each other, only different portions of the domain addresses are displayed.

17. A mobile communication terminal comprising:
   a storage unit for storing URL (uniform resource locator) information from websites of Internet, the URL information having at least a corresponding web site domain address, and a numeric representation of a domain name portion of the web site domain address;
   a key input unit having alphanumeric keys and an Internet designated key for Internet connection;
   a domain address processing unit for connecting to a website using the URL information: wherein connecting to one of said URL addresses comprises the steps of: inputting at least one numeric data value; extracting a record, from the storage unit, corresponding to the at least one input numeric value, wherein individual elements of a domain name portion of the URL information are determined as alphanumeric values corresponding to the at least one inputted numeric values; extracting all records corresponding to the input numeric values; selecting a record from the extracted records; and inputting an Internet key for Internet connection to the selected record.

18. The mobile communication terminal of claim 17, wherein the storage unit is configured with a domain database comprising:
   a domain address field for storing the domain address of the web site;
   a domain name field for storing the domain name included in the domain address;
   a numeral data field for storing the numerical representation of the domain name stored in the name field;
   a URL (uniform resource locator) field for storing a URL address of the web site; and
   a web page name field for storing a web page name specifying a characteristic of the web site.

* * * * *